Oct. 21, 1969 J. A. McFADDEN 3,473,952
FLUOROCARBON POLYMER RELEASE COATING
Filed Sept. 19, 1966
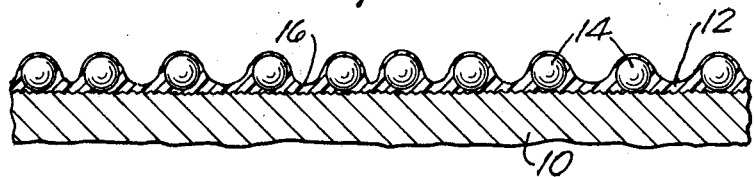
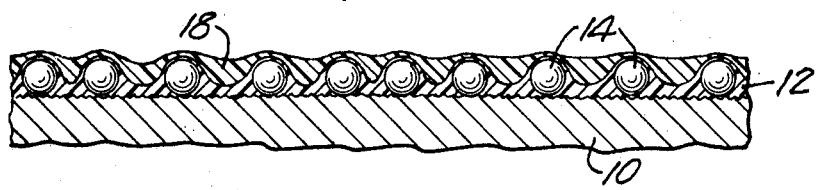
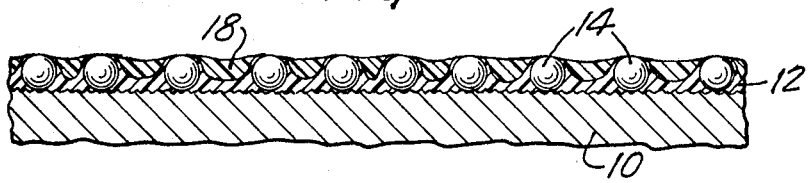
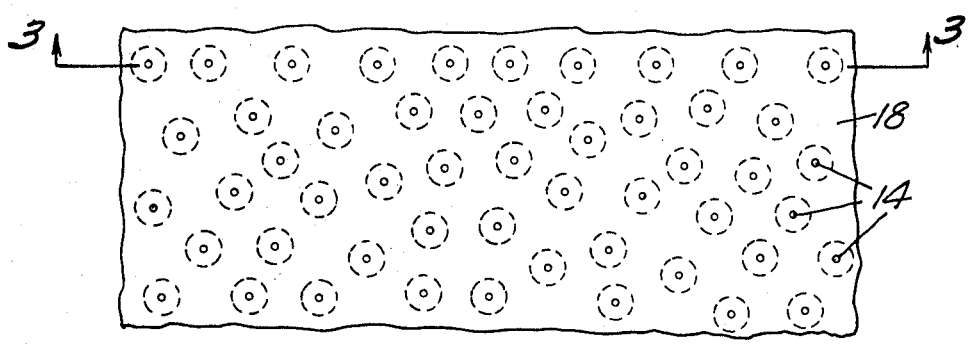
INVENTOR.
JAMES A. McFADDEN
By Carpenter, Kinney & Coulter
ATTORNEYS

United States Patent Office 3,473,952
Patented Oct. 21, 1969

3,473,952
FLUOROCARBON POLYMER RELEASE COATING
James A. McFadden, St. Paul, Minn., assignor to Minnesota Mining and Manufacturing Company, St. Paul, Minn., a corporation of Delaware
Filed Sept. 19, 1966, Ser. No. 580,540
Int. Cl. B44d *5/08, 1/36*
U.S. Cl. 117—75
9 Claims

ABSTRACT OF THE DISCLOSURE

Articles having a metal substrate, such as a cooking utensil, are coated with a release coating comprising fluorocarbon polymer, such as polytetrafluoroethylene, containing spheroidal vitreous beads, e.g. glass beads.

---

This invention relates to improved polymeric release coatings and coating compositions.

Fluorocarbon polymers such as polytetrafluoroethylene homopolymer (hereinafter referred to as PTFE), copolymers of tetrafluoroethylene with other perfluorinated monomers, and other fluorocarbon polymers, e.g. homopolymers of trichlorofluoroethylene and copolymers of the latter with tetrafluoroethylene, are widely used to provide heat-resistant non-stick release coatings on metal substrates, i.e. coatings having surfaces which are inert and passive to adherence of food and various other tacky substances. In cooking utensils, PTFE release coatings obviate the need for greases, fats, and oils in frying and greatly simplify cleaning of the utensils. In industrial uses, fluorocarbon release coatings obviate the need for slip agents and other detackifiers where films, papers, and even adhesive coated webs are passed over rollers or hot cans and the like.

These coatings, however, suffer from a lack of durability due to the sensitivity thereof, particularly at high temperatures, to high unit loads and are readily gouged when sharp edges of metal tools, bones, or the like are pressed into the polymer. This lack of durability has resulted in recommendations from manufacturers of PTFE coated cookware that only wooden or plastic utensils be used on these coatings since gouging of the coatings reduce their effectiveness as release coatings. Further, once the coating is breached, as by a gouge or abrasion, to the underlying substrate, there is a marked tendency for the coating to lose anchorage and lift away from the substrate. Because of the tenuous nature of the coating anchorage, even with careful use, such coatings retain their integrity and thus their utility as release coatings for only a limited time.

Various solutions have been proposed in attempts to improve the durability of these release coatings. For example, in U.S. Patent 2,944,917 (Cahne), issued July 12, 1960, in order to improve substrate anchorage it was proposed to etch the substrate with an acid which undercuts the metal to form cavities in which the entrances are of a slightly smaller diameter than the cavities themselves to firmly mechanically anchor the coatings to their substrates. While this approach does nothing to protect against breaching, as by gouging or cutting the coatings, it may assist in preventing extensive peeling of the coating around the gouged or cut areas. Another proposed solution has been to flame spray the substrate with a metal or metal oxide coating to provide a rough layer over which the PTFE is applied. While this solution is designed to improve both the coating anchorage and abrasion resistance, it does so at the expense of release properties. Moreover, the treatment is quite involved and difficulty practiced.

The present invention provides improved fluorocarbon and other polymeric release coatings having surfaces which are highly resistant to breaching by gouging, cutting and abrasion so that penetration through the coatings to the underlying substrates is successfully prevented in most instances, even when sharp metal implements such as spatulas are used on heated coatings. Thus, the integrity of the coating is maintained, and anchorage to the substrate is not disturbed. Surprisingly, these new coatings also appear to have better release characteristics than their unimproved counterparts. These new improved release coatings are economical and can be applied to substrates using equipment and techniques conventionally used in the application of PTFE coatings.

The extremely good gouge and abrasion resistance of these new release coatings makes use of fluorocarbon release coatings on surfaces of manufacturing and processing machinery which contact tacky substances, for example, rollers and hot cans used in the processing of adhesives, and papers, coatings and the like, both practical and economical. The compositions and coatings of the present invention greatly extend the fields of use of fluorocarbon release coatings and make it economically practical to use such release coatings on a wide variety of consumer and industrial equipment where release coatings are desirable.

The release coatings of this invention comprise tiny, microscopic, smooth-surfaced vitreous spheroidal, and preferably spherical, beads as a discontinuous phase in a continuous phase of passive surfaced polymer, usually a perfluorinated polymer, the beads being distributed as a substantially single layer in the coating so as to present a bead studded surface wherein the beads are imbedded in the coating, so that only the tips thereof are adjacent to or exposed as part of the coating surface on a general level therewith, or slightly above. The rounded bead surfaces protect the surface of the coating against breaching by deflecting sharp points, blades or edges pressed against the coating, causing them to ride over the beaded surface. Repeated scraping of, for example, a metal spatula over the coatings of this invention results in a dark colored powder, indicating that metal is actually honed off of the spatula edge. In the case of abrading pressures on the coatings, the bead surfaces act as bearings to ease the passage of the abrading substance over the coating. Surprisingly, the presence of the apparently exposed vitreous, e.g. glass, bead surfaces on the coatings, seems additionally to enhance the already good release characteristics of the coatings, even though the release characteristics of glass are not nearly as good as those of PTFE, the usual release coating polymer for cookware. Further, the seal formed between beads and polymer at the exposed juncture thereof remain unaffected by hot fats, solvents, and other contacting agents. A further advantage of the coatings of this invention is that conventional spraying equipment can be used in applying the same in the form of a polymer dispersion containing the spherical vitreous beads without any severe wear problems in the spray equipment.

The invention will be further described with reference to the accompanying drawings wherein:

FIGURE 1 is a magnified broken-away cross-sectional view of a substrate primed with a bead-containing primer composition for reception of the passive surfaced fluorocarbon release coating layer;

FIGURE 2 shows the completed coated substrate of FIGURE 1;

FIGURE 3 shows the coated substrate of FIGURE 2 after mechanical abrasion; and

FIGURE 4 is a top view of the coated substrate shown in FIGURE 3.

In FIGURE 1 is shown a substrate 10 to be coated. The surface 12 of the substrate upon which the coating is to be applied is thoroughly cleaned and preferably roughened by sand blasting, by acid or caustic etching, or by anodizing in the case of aluminum, to provide a surface which is clean and preferably slightly rough. A suspensoid of spherical glass beads 14 and a bonding material 16 are then applied to the clean surface, for example, by spraying to form a uniform single layer of beads. In the case of PTFE, the bonding material or primer may be a conventional primer comprising an aqueous suspension of particulate PTFE, wettings agent and an acidic mixture and chromic and phosphoric acids. Suitable primer formulations are described, for example, in U.S. Patent 2,562,117 (Osdal) issued July 24, 1951. This composition surprisingly strongly bonds the beads to itself and the substrate. While in the case of cooking vessels and the like where food is to be prepared, this initial coating is quite thin and serves only as a primer, in industrial applications where contamination of foodstuffs is not a problem this layer may be thicker and constitute the entire coating. However, in cooking vessels a topping layer or "enamel" of generally pure PTFE, such as 18 of FIGURE 2, is applied over the anchor coat or primer. To accomplish this, the aqueous suspending medium is dried from the primer layer which is then fused and the top coating 18, generally consisting of an aqueous dispersion of particulate PTFE polymer, is applied, dried, and fused or sintered to form the completed coating.

In FIGURES 3 and 4 are shown the coating of FIGURE 2 after a period of wear. The coating becomes worn down approximately to the tops of the beads and the reflective properties of the beads are apparent upon viewing the coatings under magnification, as in FIGURE 4. The release properties of the coating are not degraded, however, by the presence of the beads, and surprisingly even appear to be enhanced. Therefore, it is theorized that at least a thin, perhaps monomolecular, layer of the polymer remains coated over the beads. Further evidence of such a layer is indicated by the observation that there is very little tendency for food fatty acids to migrate under the coating at the exposed bead coating interface. If such migration occurred, staining would result from the carbonization of these fatty acids.

The fluorocarbon polymers with which the present invention is concerned are those inert, stable, plastic, generally wax-like polymers having passive surfaces, the monomers of which contain between 2 and 5 carbon atoms and at least one fluorine atom for every two carbon atoms in the olefin monomers. The preferred polymer of the present invention is PTFE. Other suitable polymers include copolymers of tetrafluoroethylene with perfluoropropene and chlorotrifluoroethylene and copolymers of tetrafluoroethylene with other fluorinated olefins. Because of the superior release characteristics of the completely fluorinated polymers, PTFE in particular, they are preferred as release coatings.

The PTFE polymers are generally applied to the substrates in layers, the first layer being an anchoring layer or primer, applied in the form of a suspensoid or dispersion in a dispersion vehicle, which may be an organic liquid, or preferably water, in which case a wetting agent, for example, the sodium salt of the sulphuric acid ester of a mixture of long chain alcohols, predominantly lauryl alcohol, is added. To enhance anchorage to the substrate the primer layer may include a mixture of phosphoric and chromic acids and particulate PTFE as described in the aforementioned Osdal patent. These compositions appear to interact with the metal substrates to form strong permanent bonds with the substrates. In accordance with this invention, the small vitreous beads 14 are incorporated into this primer layer dispersion, and the thus constituted dispersion sprayed or otherwise applied to the substrate 10. This layer is then dried and the final PTFE layer applied. The layers are then fused and anchored as is conventional. For cookware coatings ordinary soda-lime silica glass beads are preferred since this glass, like the top PTFE layer, is safe for use in contact with foodstuffs. In industrial uses, the primer layer may be used without a topping layer and other vitreous beads such as those of PbO, CdO, and silicate glasses may be used, depending on the use for which the coated metal substrate is intended.

Because of the known difficulty in binding PTFE to other materials and the smooth non-porous surface characteristics of glass beads, it would be expected that the glass beads would be readily dislodged from the coating. This is not the case. When the beads are applied as part of the primer layer as just described, the beads appear to firmly anchor themselves to the substrate upon fusing of the PTFE. If the beads are not firmly bonded in place in the coatings, they do not perform satisfactorily, and scraping actions on the coatings cause the beads to move and plow furrows in the coatings. The anchorage of the beads to the substrate has the further effect of increasing the overall coating anchorage to the substrate and lessening the tendency of the coating to lift from the substrate in areas immediately surrounding a breach in the coating. It is speculated that, in the case of aluminum substrates, the glass beads chemically unite with the substrate upon fusing of the PTFE by the formation of aluminum phosphate silica glass formed by interaction of the primer and the aluminum of the substrate.

As previously noted, the bead size may be from about 10 to 500 microns. The optimum diameter of the beads used in any given application is related to the total coating thickness desired. Preferably the diameter of the beads is approximately equal to, or slightly greater than, the coating thickness and the beads form a mono-layer. It is also preferred that the beads used in any given application be as uniform in size as possible so that a tool traveling over the coated surface will ride over as many beads as possible, but a considerable range of sizes can be used to provide useful results. Bead diameters ranging from about 25 to 150 microns are preferred for industrial applications.

In the case of cookware coated with PTFE, using a two-coat system as described with reference to the drawings, it is preferred to use beads having an average diameter from about 25 to 75 microns (.025 to .075 mm.). Polymer coatings less than 1 mil. (.025 mm.) in thickness tend to be defective in cohesive strength, whereas films having a thickness greater than about 3 mils (.075 mm.) require application in more than two coats in order to avoid mud cracking, i.e. cracks such as appear in mud as it dries.

The number of beads present in the coatings of the present invention as a minimum should be sufficient to provide 100 or more contact points per square inch. On a lineal basis, with a sharp edged utensil such as a three inch wide metal spatula at least about 200 beads should be supporting the spatula edge at all times. This amount of beads, at a size of 25 microns, is provided by a relatively small percentage of beads by weight of the coating, about one-half of 1%. The upper limit for the percentage of beads used is governed only by the number of beads which can be applied to the substrate in order to form a single layer of beads, the piling up of bead-on-bead being generally undesirable because the raised beads have a great tendency to move around or become dislodged when a tool rides over the coating. This upper limit has been calculated to be at about 64% by weight beads. In the case of coatings which are applied by spraying about 25% to 50% by weight of beads is preferred, due to the fact that the spraying operation causes a slight tendency of piling up of bead-on-bead if more than 50% by weight is used. It may be possible by other techniques, for example, mechanically pressing the beads down into a single layer to more closely approach the theoretical limit.

The invention will be further illustrated by the following examples in which all parts are given by weight unless otherwise indicated.

EXAMPLE I

The food-contacting surface of a steel frypan was prepared by sandblasting with grit 36 quartz sand. To a water based dispersion of PTFE as a primer (DuPont Product #850–201), analyzed as containing 47.5% solids including 31.3% particulate PTFE suspensoid, 7.8% $CrO_3$, and 8.4% $H_3PO_4$, was added 30% by weight of glass beads ("Superbrite" 660–5005 of the 3M Company), having diameters ranging from about 30 to 70 microns with an average diameter of about 50 microns. The glass content of these beads was essentially soda-lime-silica with a density of 2.5. The glass bead-containing primer was placed in a spray gun pot and sprayed onto the sand blasted frypan surface substrate, the pot being agitated slightly during application to insure good suspension and uniform distribution of the beads. The thickness of the resulting beaded film layer was about 0.6 to 1.0 mils (about .015 mm. to .025 mm.). The primed surface was then dried in a circulating air oven at approximately 250° F. (120° C.) for about 15 minutes to remove the water. The dried primer layer was then fused in an oven at approximately 750° F. (400° C.) for about 20 minutes. After cooling to room temperature, the primer layer was overcoated by spraying with a water dispersion of PTFE (DuPont Teflon Emulsion #851–214), analyzed as containing about 46% solids, principally consisting of particulate PTFE polymer and a wetting agent for the polymer particles.

The overcoating of PTFE was then dried and the finished coating fused under the same conditions to which the primer layer alone had been previously subjected. The final coating thickness was about 1.2 to 2 mils.

EXAMPLE II

A number of aluminum cooking frypans were prepared, coated and fused, following the same procedure as described in Example I with the following exceptions: A 65 grit silica sand was used for sand blasting the substrate, and the primer used (DuPont #850–202) was analyzed as containing 51.6% total solids, including 36% PTFE, 6.8% $CrO_3$ and 5.6% $H_3PO_4$.

A number of similar frypans were coated with the same PTFE primer and enamel coat to the same thickness. The coatings were fused under the same conditions set forth in Example I. The frypans were used in homes under ordinary cooking conditions, using metal spatulas and other implements during the course of the cooking. After a period of 3–6 months the coatings on the fry pans without the beads were gouged and peeled, while the fry pans having the beaded coatings were still intact except for minor surface cuts or scratches.

EXAMPLE III

A number of flat rectangular aluminum panels having a thickness of 0.1 inch were coated with a bead-containing PTFE composition as in Example II, with the exception that the primer contained 35% by weight of the glass beads. Other similar panels were coated with the conventional PTFE primary and enamel coat, as in Example II. The fused coatings were compared by testing with a Taber rotating disc abrader using two CS–10 resilient wheels on each sample. The wheels were an abrasive-filled rubber material, and 500 grams weight was applied to each wheel. With the panels coated with conventional PTFE coating, about 10% of the substrate was exposed after about 60 cycles of the abrading discs. With the glass bead containing samples, 10% of the substrate was not exposed, on the average, until about 400 cycles of the discs had been applied.

Similar control and bead-containing specimens were tested for release characteristics by applying a one-half inch wide, very tacky, rubber-resin pressure-sensitive adhesive tape to the samples. Each tape was rolled once with a 5 lb. knurled roller, and cured for four days at 120° F. in a forced air oven to insure optimum adhesion. The force required to remove each of the tapes was measured to give an indication of the release characteristics of the coating. A low force required to remove the tape indicates good release properties. Portions of the samples were abraded by scraping a one inch wide steel spatula thereover, with the blade at a 45° angle from the horizontal in a downward pressure of 990 grams on the blade. The spatula was scraped over each coating ten times forward and backward. The release characteristics were again measured by means of the pressure-sensitive adhesive tape on the abraded areas. The ounces of force required to remove the tape were recorded and are tabulated in Table I. The subsequent adhesion to clean glass of the tapes removed from the abraded areas was measured, to detect whether the tapes were contaminated by any particles of abraded material. The values recorded in the latter test are also recorded in Table I.

TABLE I

| Sample | 180° Peel, oz. Force Required to Remove Tape | | Subsequent Adhesion to Glass |
|---|---|---|---|
| | Unabraded | Abraded | |
| PTFE coating without beads | 24 | 25 | 22 |
| PTFE coating w./35 wt. percent glass beads | 0 | 1–3 | 33 |

What is claimed is:

1. An article comprising a metal substrate having a polymeric release coating on the surface thereof, said release coating comprising a continuous phase of an inert fluorocarbon polymer having a passive non-adherent surface and a discontinuous phase of smooth-surfaced spheroidal solid vitreous beads having diameters in the range of from about 10 microns to 500 microns, a substantially single layer of said beads being embedded in said polymer so that adjacent to, or at the coating surface, there are at least about 100 beads per square inch of surface.

2. An article according to claim 1 wherein the thickness of said coating is approximately equal to the average diameter of said beads.

3. An article according to claim 2 wherein said coating comprises polytetrafluoroethylene and said beads are glass beads.

4. A cooling utensil having a layer of non-stick plastic material bonded to the food-contacting metal surface thereof, said layer comprising a continuous phase of an inert fluorocarbon polymer having a passive non-adherent surface and a discontinuous phase of a substantially single layer of smooth-surfaced spheroidal solid glass beads, said beads being firmly adhered to said polymer and having diameters in the range of from about 10 microns to 150 microns, said beads being embedded in said polymer so that adjacent to or at the coating surface there are at least about 100 beads per square inch of surface.

5. A cooking utensil according to claim 4 wherein said polymer is polytetrafluoroethylene.

6. A cooling utensil according to claim 5 wherein said metal surface is that of aluminum or steel.

7. An article comprising a metal substrate having a polytetrafluoroethylene release coating firmly adherently bonded to the surface thereof, said release coating comprising a dry, fused first layer adjacent said surface comprising a continuous phase of polytetrafluoroethylene bonded to said surface with the aid of a bonding aid, said first layer containing as a discontinuous phase therein smooth, substantially spherical solid glass beads having an average diameter between about 25 to 75 microns, a dry, fused second layer of polytetrafluoroethylene firmly bonded to and uniformly covering said first layer, the combined thickness of said first and second layers being about 25 to 75 microns, the combined thickness of said layers being approximately equal to the average diameter of said beads, said beads being uniformly distributed throughout said first layer and being present in an amount such that there are at least about 100 beads per square inch of surface.

8. A coating composition comprising a suspensoid in a dispersion vehicle of fluorocarbon polymer and particulate solid spherical glass beads having diameters between 10 and 500 microns.

9. The coating composition according to claim 8 wherein said dispersion vehicle is an aqueous vehicle, said fluorocarbon polymer is polytetrafluoroethylene, said beads are glass beads having a diameter of 150 microns, and further comprises a mixture of chromic and phosphoric acid dissolved in said aqueous vehicle.

References Cited

UNITED STATES PATENTS

| | | | |
|---|---|---|---|
| 1,960,042 | 5/1934 | Andrus | 117—135 X |
| 2,562,118 | 7/1951 | Osdal | 117—132 X |
| 3,036,928 | 5/1962 | Poole | 260—41 X |
| 3,056,709 | 10/1962 | Rising et al. | 260—41 X |
| 3,249,947 | 5/1966 | Williams | 117—26 |
| 3,271,653 | 9/1966 | Wolf | 117—75 X |
| 3,288,618 | 11/1966 | De Vries | 260—41 X |

OTHER REFERENCES

Alford et al., Modern Plastics, November 1961, pp. 141, 142, 145, 146, 150, 223.

RALPH S. KENDALL, Primary Examiner

U.S. Cl. X.R.

117—97, 132, 161; 148—6.16; 220—64; 260—41